(12) United States Patent
Huffer et al.

(10) Patent No.: US 10,733,912 B2
(45) Date of Patent: *Aug. 4, 2020

(54) FLEXIBLE LAMINATE FOR PACKAGING WITH INTEGRATED PEELABLE PORTION

(71) Applicant: SONOCO DEVELOPMENT, INC., Hartsville, SC (US)

(72) Inventors: Scott William Huffer, Hartsville, SC (US); Jonathan Edward Trollen, Cincinnati, OH (US)

(73) Assignee: Sonoco Development, Inc., Hartsville, SC (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/008,513

(22) Filed: Jun. 14, 2018

(65) Prior Publication Data

US 2018/0293918 A1    Oct. 11, 2018

Related U.S. Application Data

(60) Continuation of application No. 15/676,167, filed on Aug. 14, 2017, now Pat. No. 10,026,339, which is a
(Continued)

(51) Int. Cl.
*G09F 3/02* (2006.01)
*B32B 7/02* (2019.01)
(Continued)

(52) U.S. Cl.
CPC ............... *G09F 3/02* (2013.01); *B32B 1/00* (2013.01); *B32B 3/00* (2013.01); *B32B 3/02* (2013.01);
(Continued)

(58) Field of Classification Search
CPC ...... G09F 3/02; G09F 3/10; G09F 2003/0241; G09F 2003/0257; B32B 3/00; B32B 3/18;
(Continued)

(56) References Cited

U.S. PATENT DOCUMENTS 1,827,636 A     10/1931   Ames
2,131,575 A      9/1938   Whipple
(Continued)

FOREIGN PATENT DOCUMENTS

CA      2918375     1/2015
CN      1558827    12/2004
(Continued)

OTHER PUBLICATIONS

International Search Report and Written Opinion of the International Seaching Authority for International Application No. PCT/US2018/054170 dated Nov. 27, 2018.
(Continued)

*Primary Examiner* — Patricia L. Nordmeyer
(74) *Attorney, Agent, or Firm* — Nelson Mullins Riley & Scarborough LLP

(57) ABSTRACT

A flexible laminate structure for making a package and methods for constructing such flexible laminate structures are described that provide a peelable portion integral to the laminate structure. An inner ink layer may be printed on the peelable portion that includes a promotional offer, such as in the form of a barcode, where the inner ink layer is not visible to a consumer without first peeling the peelable portion off the package due to the presence of one or more blocker ink layers.

15 Claims, 2 Drawing Sheets

Related U.S. Application Data division of application No. 14/718,824, filed on May 21, 2015, now Pat. No. 9,928,757.

(51) Int. Cl.

| | |
|---|---|
| *B32B 7/06* | (2019.01) |
| *B32B 7/12* | (2006.01) |
| *B32B 7/14* | (2006.01) |
| *B32B 27/08* | (2006.01) |
| *B32B 27/32* | (2006.01) |
| *B32B 27/36* | (2006.01) |
| *B32B 3/18* | (2006.01) |
| *B32B 3/26* | (2006.01) |
| *B32B 7/00* | (2019.01) |
| *B32B 7/04* | (2019.01) |
| *B32B 7/10* | (2006.01) |
| *B32B 27/00* | (2006.01) |
| *B32B 27/06* | (2006.01) |
| *B32B 27/28* | (2006.01) |
| *B32B 1/00* | (2006.01) |
| *B32B 3/00* | (2006.01) |
| *B32B 3/02* | (2006.01) |
| *B32B 3/20* | (2006.01) |
| *G09F 3/10* | (2006.01) |

(52) U.S. Cl.
CPC ............... *B32B 3/18* (2013.01); *B32B 3/20* (2013.01); *B32B 3/26* (2013.01); *B32B 3/266* (2013.01); *B32B 7/00* (2013.01); *B32B 7/02* (2013.01); *B32B 7/04* (2013.01); *B32B 7/06* (2013.01); *B32B 7/10* (2013.01); *B32B 7/12* (2013.01); *B32B 7/14* (2013.01); *B32B 27/00* (2013.01); *B32B 27/06* (2013.01); *B32B 27/08* (2013.01); *B32B 27/28* (2013.01); *B32B 27/32* (2013.01); *B32B 27/36* (2013.01); *G09F 3/10* (2013.01); *B32B 2250/00* (2013.01); *B32B 2255/10* (2013.01); *B32B 2255/28* (2013.01); *B32B 2307/40* (2013.01); *B32B 2307/4023* (2013.01); *B32B 2307/4026* (2013.01); *B32B 2307/50* (2013.01); *B32B 2307/546* (2013.01); *B32B 2307/58* (2013.01); *B32B 2307/748* (2013.01); *B32B 2307/75* (2013.01); *B32B 2439/00* (2013.01); *B32B 2439/06* (2013.01); *B32B 2439/40* (2013.01); *B32B 2439/46* (2013.01); *B32B 2439/70* (2013.01); *G09F 2003/0241* (2013.01); *G09F 2003/0257* (2013.01)

(58) Field of Classification Search
CPC .. B32B 3/266; B32B 3/20; B32B 3/02; B32B 3/26; B32B 27/36; B32B 27/00; B32B 27/32; B32B 27/06; B32B 27/08; B32B 27/28; B32B 7/12; B32B 7/10; B32B 7/00; B32B 7/04; B32B 7/14; B32B 7/02; B32B 7/06; B32B 1/00; B32B 2439/00; B32B 2439/70; B32B 2439/40; B32B 2439/06; B32B 2439/46; B32B 2307/748; B32B 2307/50; B32B 2307/4026; B32B 2307/4023; B32B 2307/75; B32B 2307/58; B32B 2307/40; B32B 2307/546; B32B 2255/28; B32B 2255/10; B32B 2250/00

See application file for complete search history.

(56) References Cited

U.S. PATENT DOCUMENTS

| | | |
|---|---|---|
| 2,861,735 A | 11/1958 | Faltin |
| 2,952,395 A | 9/1960 | Spees |
| 2,991,001 A | 7/1961 | Hughes |
| 3,127,087 A | 3/1964 | Spees |
| 3,239,097 A | 3/1966 | Bates et al. |
| 3,259,303 A | 7/1966 | Repko |
| 3,266,965 A | 8/1966 | Spees |
| 3,279,331 A | 10/1966 | Platt |
| 3,335,939 A | 8/1967 | Robinson, Jr. |
| 3,942,640 A | 3/1976 | Hellstrom |
| 3,946,872 A | 3/1976 | Sturm |
| 4,023,292 A | 5/1977 | Shibata et al. |
| 4,066,600 A | 1/1978 | Pletcher et al. |
| 4,185,754 A | 1/1980 | Julius |
| 4,264,662 A | 4/1981 | Taylor et al. |
| 4,280,653 A | 7/1981 | Elias |
| 4,325,393 A | 8/1982 | Price |
| 4,345,393 A | 8/1982 | Price et al. |
| 4,353,460 A | 10/1982 | Kahn |
| 4,372,460 A | 2/1983 | Brochman et al. |
| 4,381,848 A | 5/1983 | Kahn |
| 4,452,842 A | 6/1984 | Borges et al. |
| 4,464,158 A | 8/1984 | Kardon |
| 4,502,599 A | 3/1985 | Perecman |
| 4,531,668 A | 7/1985 | Forbes, Jr. |
| 4,574,952 A | 3/1986 | Masui |
| 4,584,201 A | 4/1986 | Boston |
| 4,679,693 A | 7/1987 | Forman |
| 4,738,365 A | 4/1988 | Prater |
| 4,785,940 A | 11/1988 | Wilson |
| 4,838,429 A | 6/1989 | Fabisiewicz et al. |
| 4,846,504 A | 7/1989 | MacGregor et al. |
| 4,871,265 A | 10/1989 | Peck |
| 4,913,560 A | 4/1990 | Herrington |
| 5,044,776 A | 9/1991 | Schramer et al. |
| 5,123,535 A | 6/1992 | Patnode et al. |
| 5,235,149 A | 8/1993 | Boehrerk |
| 5,265,794 A | 11/1993 | Johnston |
| 5,415,910 A | 5/1995 | Knauf |
| 5,484,167 A | 1/1996 | Donaldson et al. |
| 5,507,428 A | 4/1996 | Robinson, Jr. et al. |
| 5,569,515 A | 10/1996 | Rice, II et al. |
| 5,571,358 A | 11/1996 | Napier et al. |
| 5,832,145 A | 11/1998 | Dais et al. |
| 5,833,368 A | 11/1998 | Kaufman |
| 5,855,435 A | 1/1999 | Chiesa |
| 5,871,096 A | 2/1999 | Yakich |
| 5,902,045 A | 5/1999 | Resteghini |
| 5,910,348 A | 6/1999 | Hart-Smith et al. |
| 5,947,368 A | 9/1999 | Thresher et al. |
| 5,958,486 A | 9/1999 | Ringdahl et al. |
| 5,979,748 A | 11/1999 | Drummond et al. |
| 6,026,953 A | 2/2000 | Nakamura et al. |
| 6,041,929 A | 3/2000 | Brunner et al. |
| 6,047,488 A | 4/2000 | Tuskiewicz |
| 6,056,141 A | 5/2000 | Navarini et al. |
| 6,190,485 B1 | 2/2001 | Cahill et al. |
| 6,196,450 B1 | 3/2001 | Varadarajan et al. |
| 6,206,570 B1 | 3/2001 | Cortopassi |
| 6,234,386 B1 | 5/2001 | Drummond et al. |
| 6,264,098 B1 | 7/2001 | Drummond et al. |
| 6,270,004 B1 | 8/2001 | Drummond et al. |
| 6,302,321 B1 | 10/2001 | Reese et al. |
| 6,328,203 B1 | 12/2001 | Tedford, Jr. |
| 6,334,711 B1 | 1/2002 | Risgalla et al. |
| 6,383,592 B1 | 5/2002 | Lowry et al. |
| 6,428,867 B1 | 8/2002 | Scott et al. |
| 6,460,720 B1 | 10/2002 | Massey et al. |
| 6,497,336 B2 | 12/2002 | Grayer |
| 6,544,613 B1 | 4/2003 | Varadarajan |
| 6,589,622 B1 | 7/2003 | Scott |
| 6,620,275 B1 | 9/2003 | Avila et al. |
| 6,660,353 B2 | 12/2003 | Siedl |
| 6,746,743 B2 | 1/2004 | Knoerzer et al. |
| 6,857,561 B2 | 2/2005 | Williams et al. |

(56) References Cited

U.S. PATENT DOCUMENTS

| | | |
|---|---|---|
| 6,858,108 B2 | 2/2005 | Matthews et al. |
| 6,890,112 B2 | 5/2005 | Kline |
| 6,991,375 B2 | 1/2006 | Clune et al. |
| 7,144,635 B2 | 12/2006 | Hawes et al. |
| 7,189,300 B2 | 3/2007 | Knoerzer et al. |
| 7,228,961 B2 | 6/2007 | Koetter et al. |
| 7,344,744 B2 | 3/2008 | Sierra-Gomez et al. |
| 7,416,768 B2 | 8/2008 | Knoerzer et al. |
| 7,422,782 B2 | 9/2008 | Haedt et al. |
| 7,608,317 B2 | 10/2009 | Keckeisen et al. |
| 7,686,513 B2 | 3/2010 | Knoerzer et al. |
| 7,717,620 B2 | 5/2010 | Hebert et al. |
| 7,789,236 B2 | 9/2010 | Burgess |
| 7,828,923 B2 | 11/2010 | Patel |
| 7,955,678 B2 | 6/2011 | Stogbauer et al. |
| 8,051,979 B2 | 11/2011 | Smith et al. |
| 8,408,451 B2 | 4/2013 | Adam et al. |
| 8,443,578 B2 | 5/2013 | Sargin et al. |
| 8,544,718 B2 | 10/2013 | Yamato et al. |
| 8,646,975 B2 | 2/2014 | Moehlenbrock et al. |
| 8,740,052 B2 | 6/2014 | Drummond |
| 8,746,490 B2 | 6/2014 | Huffer et al. |
| 9,096,346 B2 | 8/2015 | Huffer |
| 9,278,506 B2 | 3/2016 | McLean |
| 9,850,056 B2 | 12/2017 | Shaw et al. |
| 9,928,757 B2 | 3/2018 | Huffer et al. |
| 10,026,339 B2 | 7/2018 | Huffer et al. |
| 2003/0178429 A1 | 9/2003 | Williams et al. |
| 2004/0013827 A1 | 1/2004 | Zuser et al. |
| 2004/0064983 A1 | 4/2004 | Joseph |
| 2004/0079763 A1 | 4/2004 | Powell et al. |
| 2005/0031814 A1 | 2/2005 | Dawes |
| 2005/0078890 A1 | 4/2005 | Abe et al. |
| 2005/0109652 A1 | 5/2005 | Goepfert |
| 2005/0153113 A1 | 7/2005 | Hseih et al. |
| 2005/0276525 A1 | 12/2005 | Hebert et al. |
| 2006/0138207 A1 | 6/2006 | Levine et al. |
| 2006/0147129 A1 | 7/2006 | Miller |
| 2006/0198986 A1 | 9/2006 | Keckeisen et al. |
| 2007/0051790 A1 | 3/2007 | Smith et al. |
| 2008/0037911 A1 | 2/2008 | Cole et al. |
| 2008/0044114 A1 | 2/2008 | Hall et al. |
| 2008/0073308 A1 | 3/2008 | Yousif |
| 2008/0240627 A1 | 10/2008 | Cole et al. |
| 2008/0272016 A1 | 11/2008 | Anderson et al. |
| 2009/0194451 A1 | 8/2009 | Leiner et al. |
| 2009/0226117 A1 | 9/2009 | Davis et al. |
| 2009/0274799 A1 | 11/2009 | Lee et al. |
| 2010/0019022 A1 | 1/2010 | Ryan et al. |
| 2010/0098355 A1 | 4/2010 | Jansen |
| 2010/0111453 A1 | 5/2010 | Dierl |
| 2010/0147724 A1 | 6/2010 | Mitra-Shah et al. |
| 2010/0288760 A1 | 11/2010 | McGrew et al. |
| 2011/0038569 A1 | 2/2011 | Huffer et al. |
| 2011/0049168 A1 | 3/2011 | Loftin |
| 2011/0089177 A1 | 4/2011 | Thorstensen-Woll |
| 2011/0204056 A1 | 8/2011 | Veternik et al. |
| 2012/0082764 A1 | 4/2012 | Paterson |
| 2012/0125932 A1 | 5/2012 | Sierra-Gomez et al. |
| 2012/0177307 A1 | 7/2012 | Duan et al. |
| 2012/0314979 A1 | 12/2012 | Heininga |
| 2013/0026170 A1 | 1/2013 | Zerfas et al. |
| 2013/0056470 A1 | 3/2013 | Hallak |
| 2013/0089280 A1 | 4/2013 | Tseng et al. |
| 2013/0101239 A1 | 4/2013 | Kropf et al. |
| 2013/0114918 A1 | 5/2013 | Lyzenga et al. |
| 2013/0121624 A1 | 5/2013 | Lyzenga et al. |
| 2013/0011527 A1 | 10/2013 | Renders et al. |
| 2013/0279832 A1 | 10/2013 | Burri et al. |
| 2013/0320019 A1 | 12/2013 | Tinoco et al. |
| 2014/0000219 A1 | 1/2014 | Pezzoli |
| 2014/0079343 A1 | 3/2014 | Lyzenga et al. |
| 2014/0270597 A1 | 9/2014 | Friedman et al. |
| 2014/0363545 A1 | 12/2014 | Veternik et al. |
| 2014/0376836 A1 | 12/2014 | Schieber |
| 2015/0158643 A1 | 6/2015 | Coker et al. |
| 2015/0297005 A1 | 10/2015 | Janor |
| 2015/0353238 A1 | 12/2015 | Moehlenbrock et al. |
| 2016/0009447 A1 | 1/2016 | Rhue |
| 2016/0096667 A1 | 4/2016 | Huffer |
| 2016/0122109 A1 | 5/2016 | Clark |
| 2016/0130041 A1 | 5/2016 | Giorgio et al. |
| 2016/0167680 A1 | 7/2016 | Tomsovic et al. |
| 2016/0227835 A1 | 8/2016 | Swede |
| 2016/0236844 A1 | 8/2016 | Gagne et al. |
| 2016/0288960 A1 | 10/2016 | Branyon |
| 2016/0343275 A1 | 11/2016 | Huffer et al. |
| 2017/0121086 A1 | 5/2017 | Hartley |
| 2017/0121088 A1 | 5/2017 | Rhue |
| 2017/0283149 A1 | 10/2017 | Rhue |

FOREIGN PATENT DOCUMENTS

| | | |
|---|---|---|
| DE | 8903067 | 7/1989 |
| EP | 0488967 A1 | 6/1992 |
| EP | 0499647 B1 | 1/1995 |
| EP | 0952087 A2 | 10/1999 |
| EP | 1080874 | 3/2001 |
| EP | 1477408 A1 | 11/2004 |
| EP | 1770025 A2 | 4/2009 |
| FR | 1514374 A | 2/1968 |
| FR | 2 463 468 A1 | 2/1981 |
| GB | 2147564 A | 5/1985 |
| GB | 2491646 A | 12/2012 |
| JP | 2000 203654 A | 7/2000 |
| JP | 2013 147269 A | 8/2013 |
| WO | WO 95/29097 A1 | 11/1995 |
| WO | WO 96/25333 A1 | 8/1996 |
| WO | WO 98/28728 A1 | 7/1998 |
| WO | WO 03/062090 A1 | 7/2003 |
| WO | WO 2006/093898 A1 | 9/2006 |
| WO | WO 2008/086389 A2 | 7/2008 |
| WO | WO 2011/158014 A1 | 12/2011 |
| WO | WO 2012/036765 A1 | 3/2012 |
| WO | WO 2014/186571 A2 | 11/2014 |
| WO | WO 2015/009658 A2 | 1/2015 |
| WO | WO 2006/132761 A2 | 12/2016 |

OTHER PUBLICATIONS

Canadian Patent Application No. 3,006,160, filed May 25, 2018, Canadian Office Action dated Apr. 2, 2019.

U.S. Appl. No. 15/807,200, entitled "Membrane Lid With Integrated Peelable Portion," filed Nov. 8, 2017, Non-Final Office Action dated May 31, 2019.

"Tamper-evidence: Consumers have come to expect tamper-evidence for drugs, foods"; Packaging (Boston, Mass); Mar. 19, 1989; vol. 34, No. 5 (3 pgs.).

"Innovations for opening and closing"; Food Trade Review; Oct. 1993; vol. 63, No. 4 (3 pgs.).

Kate Bertrand; "Improve security through packaging: emerging technologies can help create a package that safeguards products from tampering and protects your brand from counterfeiting"; Food Processing; Feb. 2006; vol. 67, No. 2 (5 pgs.).

U.S. Appl. No. 15/442,779, entitled "Resealable Flexible Packaging", filed Feb. 27, 2017.

U.S. Appl. No. 15/656,481, entitled "Tamper Evident Hybrid Resealable Container", filed Jul. 21, 2017.

U.S. Appl. No. 15/807,200, entitled "Membrane Lid With Integrated Peelable Portion", filed Nov. 8, 2017.

LPS Industries, Loc n Press Pressure Sensitive Zippered Envelopes, www.lpsind.com, accessed Apr. 1, 2015.

ITC, Custom Adhesive Tape Manufacturing & Design, www.itctapes.com, accessed Feb. 2, 2015.

Clearbags, Value Crystal Clear Bags, www.clearbags.com, accessed Apr. 1, 2015.

Final Office Action for U.S. Appl. No. 14/928,489 dated Mar. 22, 2018.

International Search Report and Written Opinion of the International Searching Authority for International Application No. PCT/US2017/064594 dated Mar. 27, 2018.

(56) References Cited

OTHER PUBLICATIONS

Non-final Office Action for U.S. Appl. No. 14/676,390 dated Apr. 27, 2018.
Non-final Office Action for U.S. Appl. No. 14/871,398 dated May 2, 2018.
Office Action for corresponding Canadian Patent Application No. 2,847,432 dated Nov. 25, 2014.
Extended European Search Report for European Patent Application No. 16165679.8 dated Jul. 28, 2016, 7 pages.
Office Action for Canadian Patent Application No. 2,927,049 dated Jan. 11, 2017, 5 pages.
Non-Final Office Action for U.S. Appl. No. 15/807,200 dated Nov. 18, 2019.
Non-Final Office Action for U.S. Appl. No. 15/442,779 dated Oct. 8, 2019.
European Examination Report for European Patent Application No. 18174601.7 dated Oct. 9, 2019.
Extended European Search Report for Application No. 18174641.3 dated Sep. 10, 2018; all pages.
Canadian Patent Application No. 3,006,160, filed May 25, 2018, Canadian Office Action dated Dec. 31, 2019.

FLEXIBLE LAMINATE FOR PACKAGING WITH INTEGRATED PEELABLE PORTION

CROSS-REFERENCE TO RELATED APPLICATION

This application is a continuation of U.S. application Ser. No. 15/676,167 entitled "Flexible Laminate for Packaging with Integrated Peelable Portion filed Aug. 14, 2017, which is a divisional of U.S. application Ser. No. 14/718,824 entitled "Flexible Laminate for Packaging with Integrated Peelable Portion" filed May 21, 2015, both of which are incorporated herein in their entirety by reference.

BACKGROUND

The present disclosure relates in general to packaging for products, and more particularly to flexible laminate structures for packaging. The disclosure is especially concerned with flexible laminates that include an integrated peelable portion, where an inner ink layer provided on the peelable portion is not visible through an outer layer of the peelable portion and can only be seen by a consumer after the peelable portion has been peeled off the package.

Flexible materials, such as flexible films, foils, and paper-based materials, can be used to construct packages for products, including package bodies and lidding. Such packages can be used to hold a variety of items, from food products (perishable and non-perishable) to electronics to household goods.

In an effort to incentivize consumers to purchase their products, a manufacturer may wish to provide a special offer to a consumer who buys a particular product, such as a rebate on the purchase of the product, a discount on the product being purchased, or a discount on a future purchase of the same or a related product.

BRIEF SUMMARY

Embodiments of the invention described herein provide improved packages, package components, and methods for constructing packages that provide a mechanism for providing promotional offers, such as coupons or other offers related to a purchase, in a manner that is less costly, more reliable, more aesthetically appealing, and less susceptible to fraud than conventional mechanisms. In particular, embodiments of the invention include a peelable portion of a package that is integrated with the flexible laminate structure of the package, such that the peelable portion (e.g., the coupon) is part of the package structure rather than applied to the outside of the package structure after the package has been assembled.

Accordingly, in some embodiments, a flexible laminate structure for a package is provided that includes an outer layer, an inner layer laminated to the outer layer, a blocker ink layer disposed between the inner layer and the outer layer, an inner ink layer disposed between the blocker ink layer and the inner layer, and a pressure sensitive adhesive layer applied to the inner layer. A cut line may be defined through part of a thickness of the laminate structure to form a peelable portion that includes the inner ink layer, the blocker ink layer, and the outer layer. The inner ink layer may be obscured from view through the outer layer, and the inner ink layer may be visible on the peelable portion after removal of the peelable portion from the inner layer.

In some cases, the flexible laminate structure may further comprise an outer ink layer disposed between the outer layer and the blocker ink layer, and the peelable portion may include the outer ink layer. The outer ink layer may be visible through the outer layer. The pressure sensitive adhesive layer may further include an area devoid of pressure sensitive adhesive so as to form a pull tab of the peelable portion.

In some embodiments, the outer layer may comprise polyethylene terephthalate. The inner layer may comprise metalized oriented polypropylene. The pressure sensitive adhesive layer may, in some cases, be applied about a perimeter region of the peelable portion, and the inner ink layer may be aligned with a central region of the peelable portion that is free of pressure sensitive adhesive.

In still other embodiments, the inner ink layer may be adjacent to the pressure sensitive adhesive layer. Moreover, the blocker ink layer may comprise a plurality of blocker ink layers.

In some cases, the flexible laminate structure may further comprise a tie layer disposed between the blocker ink layer and the inner ink layer, where the tie layer is configured to maintain the pressure sensitive adhesive layer with the peelable portion upon removal of the peelable portion. The inner ink layer may, for example, comprise a barcode in some cases. In still other cases, the flexible laminate structure may further comprise permanent adhesive surrounding the pressure sensitive adhesive layer, where the cut line is defined within the pressure sensitive adhesive layer.

In other embodiments, a method of manufacturing a flexible laminate structure is provided, where the method includes applying a blocker ink layer to an outer layer; printing an inner ink layer on the blocker ink layer; applying a pressure sensitive adhesive to the inner ink layer; laminating the outer layer to an inner layer to form a laminate structure; and defining a cut line through part of a thickness of the laminate structure to form a peelable portion that includes the inner ink layer, the blocker ink layer, and the outer layer. The inner ink layer may be obscured from view through the outer layer, and the inner ink layer may be visible on the peelable portion after removal of the peelable portion from the inner layer.

In some cases, the method may further comprise printing an outer ink layer onto an inner surface of the outer layer, such that the outer ink layer is disposed between the outer layer and the blocker ink layer. The peelable portion may include the outer ink layer, and the outer ink layer may be visible through the outer layer. In some embodiments, the method may further comprise forming a pull tab of the peelable portion by maintaining an area of the inner layer free of pressure sensitive adhesive.

Applying the pressure sensitive adhesive to the inner ink layer may, in some cases, comprise pattern-applying the pressure sensitive adhesive about a perimeter region of the peelable portion, such that the inner ink layer is aligned with a central region of the peelable portion that is free of pressure sensitive adhesive. Additionally or alternatively, applying the pressure sensitive adhesive to the inner ink layer may comprise flood coating the inner ink layer with pressure sensitive adhesive, such that the pressure sensitive adhesive is disposed between the inner ink layer and the inner layer.

In some embodiments, applying the blocker ink layer may comprise applying a plurality of blocker ink layers to the outer ink layer. Moreover, the method may further comprise applying a tie layer between the blocker ink layer and the inner ink layer, where the tie layer is configured to maintain the pressure sensitive adhesive layer with the peelable portion upon removal of the peelable portion. In still other embodiments, the method may further comprise applying permanent adhesive around the pressure sensitive adhesive layer, wherein the cut line is defined within the pressure sensitive adhesive layer. Defining the cut line may, in some cases, comprise precision die cutting the cut line or laser scoring through at least part of the thickness of the laminate structure.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As noted above, conventional mechanisms for providing coupons and other promotional offers on product packaging is typically costly to produce, as it is an additional feature that is provided on the existing packaging structure (e.g., an additional label that must be printed and applied to the package). Moreover, such forms of coupons and offers can be susceptible to misuse, as ill-intentioned individuals may, upon seeing the offer or discount, remove the coupon from the packaging without purchasing the product. Through ingenuity and hard work, however, the inventors have developed a flexible laminate structure that allows a peelable portion to be integrally formed with the package, such that an inner ink layer provided on the peelable portion is not visible from the outside of the package, but is only visible after the peelable portion (e.g., a coupon) is removed from the package.

Figure 1A:
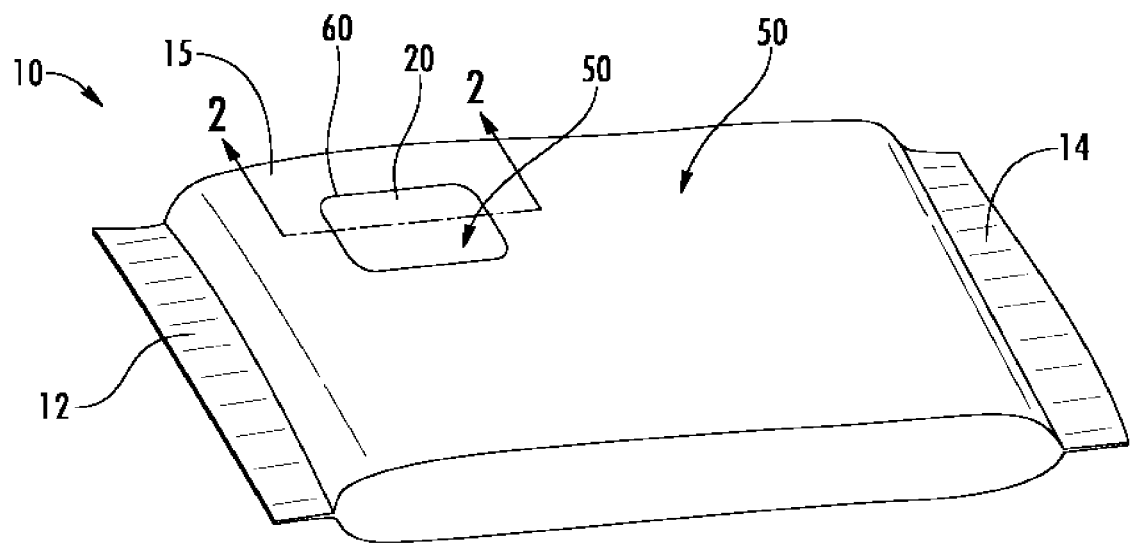
FIG. 1A is a perspective view of a package having a flexible laminate structure, where a peelable portion of the laminate structure is attached according to an example embodiment.
Figure 1B:
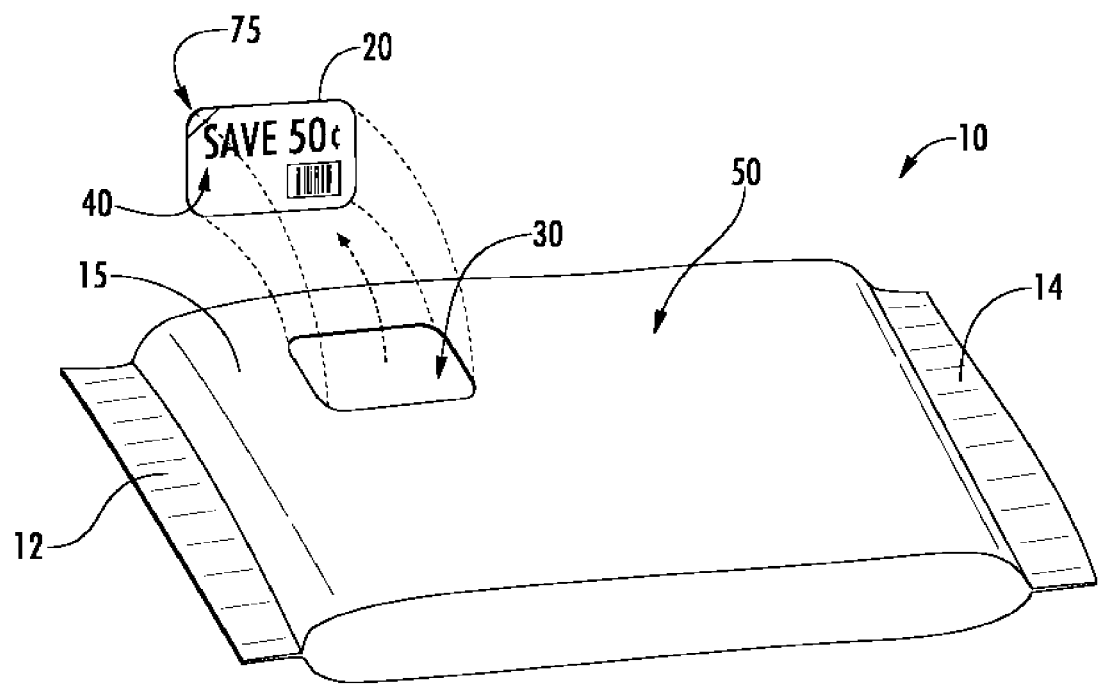
FIG. 1B is a perspective view of the package of FIG. 1A, where the peelable portion has been peeled off to reveal an inner ink layer that provides a promotional offer according to an example embodiment.

With reference to FIGS. 1A and 1B, a package 10 is provided that is made with or otherwise includes a flexible laminate structure 15. The flexible laminate structure 15 may, for example, be a multi-layer flexible film laminate, as shown, that forms the body of the package 10. The package 10 may, in such cases, includes two seals 12, 14 at respective ends of the package and a longitudinal seal (not visible in FIGS. 1A and 1B) extending between the two end seals 12, 14 for maintaining the product inside the package 10. In other cases, however, the package 10 may include foil or paper-based materials that form the body of the package 10 (see, e.g., FIG. 5). Furthermore, in some cases, the flexible laminate structure 15 may be used to make only a portion of the overall package, such as a window or a lidding for the package.

Regardless of the overall configuration of the package 10, according to embodiments of the invention, the flexible laminate structure 15 may be designed to include a peelable portion 20 that can be removed from the package 10, but that prior to its removal forms an integral part of the package. In other words, prior to separation of the peelable portion 20 from the package 10, the peelable portion may form part of the packaging structure itself, as described in greater detail below. Thus, unlike in conventional packages where any coupon or offer designed to be removed from the package is applied to or affixed to an outer surface of the overall package structure, embodiments of the present invention provide a peelable portion 20 that itself forms part of the outer surface of the package.

With reference to FIGS. 1A and 1B, the peelable portion 20 may, for example, be a coupon or other promotional offer that is redeemable by the consumer. In some cases, for example, the offer provided on the peelable portion 20 may be redeemable by the consumer at the check-out counter of the store where it is purchased. In such cases, the details of the offer (e.g., the amount of the discount) and/or instructions for obtaining the discount (e.g., a barcode for scanning at the check-out counter) may not be visible to the consumer or others prior to peeling of the peelable portion 20 away from the package 10. Rather, the consumer or other person (e.g., cashier) would have to remove the peelable portion 20 from the package to view an underside of the peelable portion (shown in FIG. 1B), which would then reveal the details of the offer. As a result, ill-intentioned consumers may be dissuaded from removing the peelable portion 20 prematurely (e.g., inside the store prior to paying for the product). Moreover, the appearance of the product packaging (e.g., the outer surface of the package 10) may maintain a clean and cohesive look that is unmarred by additional product barcodes or other notices to the consumer.

Figure 2:
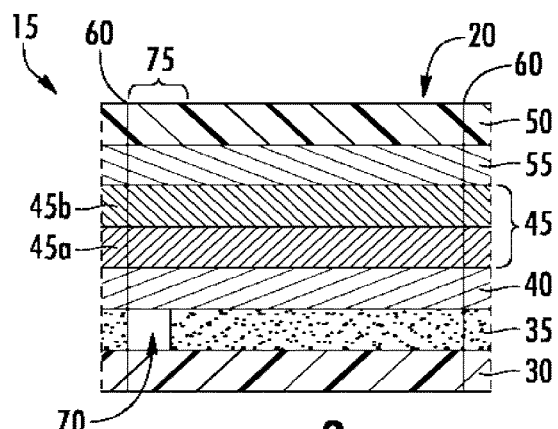
FIG. 2 is a schematic cross-sectional view of the peelable portion of FIG. 1A, where the peelable portion is attached according to an example embodiment.
Figure 3:
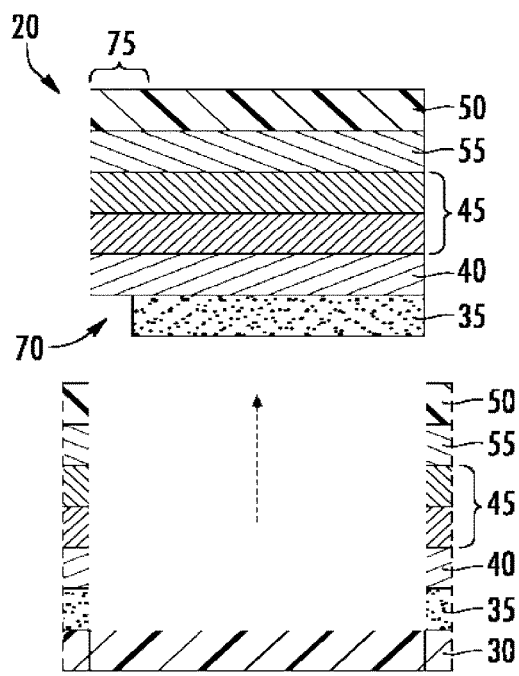
FIG. 3 is a schematic cross-sectional view of the peelable portion of FIG. 2, where the peelable portion has been separated from the inner layer according to an example embodiment.

According to example embodiments of the flexible laminate structure 15 shown in FIGS. 2 and 3, the flexible laminate structure 15 may include an inner layer 30, an outer layer 50, a blocker ink layer 45 disposed between the inner layer 30 and the outer layer 50, an inner ink layer 40 disposed between the blocker ink layer 45 and the inner layer 30, and a pressure sensitive adhesive layer 35 applied to the inner layer 30, with the outer layer 50 being laminated to the inner layer 30. In some cases, such as in the depicted embodiment, an additional, outer ink layer 55 may also be provided, where the outer ink layer is disposed between the blocker ink layer 45 and the outer layer 50, such that it is on an opposite side of the blocker ink layer 45 with respect to the inner ink layer 40, as shown. Moreover, the blocker ink layer 45 may comprise a plurality of blocker ink layers 45a, 45b, etc., as described in greater detail below.

A cut line 60 may be defined through part of a thickness of the laminate structure 15 to form the peelable portion 20 described above. In this regard, the peelable portion 20 may include at least the inner ink layer 40, the blocker ink layer(s) 45, and the outer layer 50. In some cases, such as in the depicted embodiment in which an outer ink layer 55 is provided, the peelable portion 20 may further include the outer ink layer 55. Although the peelable portion 20 is described above as including various layers, such as the inner ink layer 40, the blocker ink layer(s) 45, the outer layer 50, and/or the outer ink layer 55, it is understood that the peelable portion may, in some cases, include additional layers, such as additional ink layers, tie layers, etc. In addition, the layers included within the peelable portion 20 may extend at least partially outside of the peelable portion 20 (e.g., extending across the cut line 60), as shown in FIGS. 2 and 3, for example, such that at least part of one or more of the layers remains with the rest of the flexible laminate 15 even after the peelable portion 20 has been peeled away and removed from the inner layer 30 of the package 10. One or more of the layers (e.g., inner ink layer 40, the blocker ink layer(s) 45, the outer layer 50, and/or the outer ink layer 55) may be designed to have an area that is larger than an area of the peelable portion 20 as part of the manufacturing process, in some cases, for example, so as to ensure that when the cut line 60 is defined, the resulting peelable portion 20 includes those layers to the extent needed to provide a robust peelable portion that functions as described herein, while any portion of the layers extending outside the bounds of the peelable portion 20 may have no or negligible effect on the function or aesthetics of the remainder of the package 10. In some cases, a permanent adhesive may surround the pressure sensitive adhesive layer, outside of the cut line 60 and outside of the peelable portion 20. Thus, in some such cases, the cut line 60 may be defined between the permanent adhesive and the pressure sensitive adhesive layer.

In some embodiments, as a result of the presence of the blocker ink layer(s) 45, the inner ink layer 40 may be obscured from view through the outer layer 50. As such, a consumer or other person looking at the package 10 before the peelable portion 20 has been separated from the package (e.g., as shown in the configuration depicted in FIGS. 1A and 2) would not be able to see the inner ink layer 40 or read any indications that the inner ink layer may provide. After removal of the peelable portion 20 from the inner layer 30 (e.g., as shown in the configuration depicted in FIGS. 1B and 3), however, the inner ink layer 40 would be visible on the peelable portion (e.g., when the consumer flips over the separated peelable portion 20 to view the underside of the peelable portion, which was previously disposed opposite the outer surface of the inner layer 30).

To facilitate peeling of the peelable portion 20 off the package 10, in some cases, the pressure sensitive adhesive layer 35 may include an area 70 devoid of pressure sensitive adhesive, which forms a pull tab 75 of the peelable portion, such as in a corner of the peelable portion, as shown in FIGS. 2 and 3. In this way, for example, a user may slide a fingernail through the cut line 60 of the pull tab 75 (e.g., the cut line extending adjacent the area 70 devoid of pressure sensitive adhesive), and use the area 70 as a starting point for separating the peelable portion 20 from the inner layer 30.

As noted above, in some embodiments, the layers depicted in FIGS. 2 and 3 may be configured differently than shown and/or may include fewer or additional layers, depending on the type of package, the materials used, etc. For example, in some cases, the flexible laminate structure 15 may further include a tie layer (not shown) disposed between the blocker ink layer 45a and the inner ink layer 40 (or the blocker ink layer 45a may be selected to serve as a tie layer), wherein the tie layer is configured to maintain the pressure sensitive adhesive layer 35 with the peelable portion 20 upon removal of the peelable portion. In other words, the tie layer may serve to firmly adhere the inner ink layer 40 to the blocker ink layer 45a, such that the user's action of peeling the peelable portion 20 away from the inner film 30 does not result in the pressure sensitive adhesive layer 35 remaining adhered to the inner layer 30 and pulling the inner ink layer 40 off the blocker ink layer 45a, thereby destroying the peelable portion 20. Rather, the tendency of the pressure sensitive adhesive 35 to remain with the inner ink layer 40, such as due to the material properties of the pressure sensitive adhesive and the ink used for the inner ink layer, coupled with the enhanced adhesion between the inner ink layer 40 and the blocker ink layer 45a, would allow the pressure sensitive adhesive to be moved with the peelable portion 20 to provide meaningful, readable indications on the underside of the peelable portion 20 that the user can read when the peelable portion is removed.

The inner ink layer 40 and the pressure sensitive adhesive layer 35 can be applied in different ways, depending on the materials and inks used and the methods used to apply the various layers to the laminate structure 15. For example, in the embodiment shown in FIGS. 2 and 3, the inner ink layer 40 is disposed on the blocker ink layer 45, adjacent to the pressure sensitive adhesive layer 35, such that an upper surface of the pressure sensitive adhesive layer 35 (e.g., which extends into and/or out of the page in FIGS. 2 and 3) engages a lower surface of the inner ink layer 40 (e.g., which also extends into and/or out of the page in FIGS. 2 and 3). Thus, when viewed in cross-section as in FIGS. 2 and 3, the pressure sensitive adhesive layer 35 and the inner ink layer 40 appear as two layers disposed one on the other. In some embodiments, this is accomplished by flood coating the printed layers (e.g., the inner ink layer 40/blocker ink layer 45/outer ink layer 55 combination) with the pressure sensitive adhesive.

Figure 4:
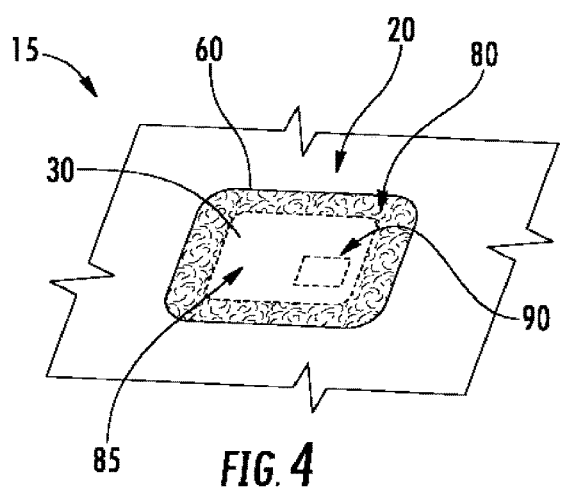
FIG. 4 is a close up view of the peelable portion of the flexible laminate structure, where the pressure sensitive adhesive layer is applied about a perimeter region of the peelable portion according to an example embodiment.

In other cases, however, the inner ink layer 40 may be applied about a perimeter region 80 of the peelable portion 20, as shown in FIG. 4. Thus, for example, the pressure sensitive adhesive may be pattern-applied in the area of the peelable portion 20, but only near the edges of the peelable portion, proximate the cut line 60, in the perimeter region 80 as illustrated. In this way, a central region 85 may be left free of pressure sensitive adhesive, and the inner ink layer (e.g., in the form of a barcode 90, shown in dashed lines in FIG. 4 for explanatory purposes) that is printed on the blocker layer 45 of the outer layer 50 may be aligned with the central region 85, where there is no pressure sensitive adhesive, when the outer layer is laminated to the inner layer. The width of the perimeter region 80 may vary, based on how much pressure sensitive adhesive is needed to maintain the peelable portion 20 with the inner layer 30 until the time it is peeled away by the consumer.

Embodiments of the flexible laminate structure, as noted above, may be configured in various ways and may include different kinds of materials to form different types of packages, as may be suitable depending on the goods to be held therein. The inner layer, for example, may be formed of a film, foil, or paper-based material. For example, in some embodiments, the inner layer 30 may comprise a metalized oriented polypropylene (mOPP) material. The outer layer 50 may be a film layer, such as a film layer comprising polyethylene terephthalate (PET). An example laminate structure may, for instance, be configured to have an inner layer 30 comprising 118 ga mOPP, a pressure sensitive adhesive layer 35 disposed on the inner layer 30, an inner ink layer 40 including a barcode (such as for an "instant savings" coupon redeemable at the cash register), two or more blocker ink layers 45, an outer ink layer 55, and an outer layer 50 comprising 92 ga PET.

Moreover, different colors and types of inks (inner ink layer 40, outer ink layer 55, and/or blocker ink layers 45) and/or tie layers may be used depending on the application. In some cases, a primer white may be used between the inner ink layer 40 and a blocker ink layer 45 (or as the blocker ink layer 45*a*) to serve as a tie layer, as described above. Additionally or alternatively, one or more of the blocker ink layers 45 may include aluminum flakes to further obscure the inner ink layer 40 from being seen from the outside of the package (prior to the peelable portion 20 being removed from the package). Another blocker ink layer 45*b* may be provided as described above and may be a high opaque white ink, whereas the outer ink layer 55 may be provided in a dark color, such as blue, to provide further obfuscation of the inner ink layer 40.

Figure 5:
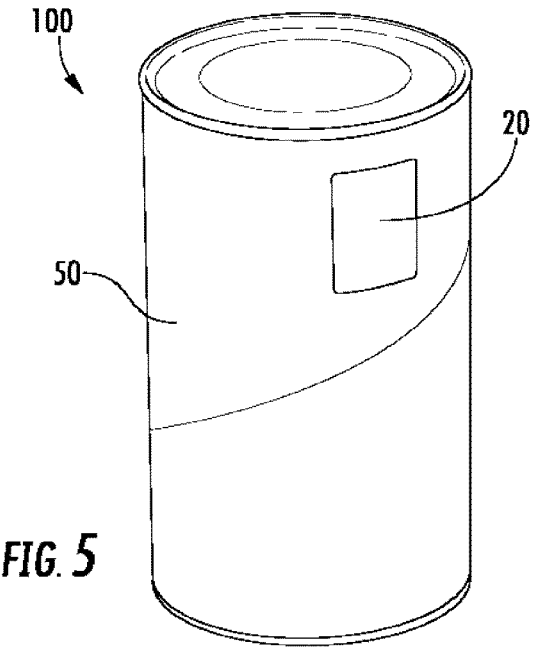
FIG. 5 is a perspective view of a package with a peelable portion according to another example embodiment.

Depending on the particular application, the materials selected for the various layers may be configured to form a laminate structure 15, where the laminate structure is used to form the package 10 (e.g., as shown in FIG. 1). In FIG. 1, for example, a flexible package 10 is shown, where the flexible laminate structure 15 is a film laminate, such as one in which the inner layer is mOPP and the outer layer is PET, as described above. In other embodiments, such as when the inner layer 30 is selected to be a paper-based material and the outer layer is a film, a package 100 may be formed as shown in FIG. 5, similar to a package for holding oatmeal or other granulated food products.

In still other embodiments, however, the laminate structure 15 may be used to form the lidding for a package, where a base member or container for holding the goods may be made according to conventional methods, and the lidding may be formed according to embodiments described herein using the laminate structure 15. In such cases, the lidding may be combined with (e.g., engaged, affixed, or secured to) the base member or container body to form the package.

Embodiments of a method of manufacturing a flexible laminate structure are also provided herein. In some embodiments, a method of manufacturing a flexible laminate structure is provided, in which a pressure sensitive adhesive is applied to an inner layer. One or more blocker ink layers may be applied to an outer layer, and an inner ink layer may be printed on the blocker ink layer(s). The outer layer may be laminated to the inner layer to form a laminate structure, and a cut line may be defined through part of a thickness of the laminate structure to form a peelable portion that includes the inner ink layer, the blocker ink layer, and the outer layer, as described above. In this way, the inner ink layer may be obscured from view through the outer layer, and the inner ink layer may be visible on the peelable portion after removal of the peelable portion from the inner layer.

In some cases, an outer ink layer may also be printed on an inner surface of the outer layer, such that the outer ink layer is disposed on an opposite side of the blocker ink layer with respect to the inner ink layer, as described above. Additionally or alternatively, multiple blocker ink layers may be used. Moreover, a tie layer may be applied between the blocker ink layer and the inner ink layer in some cases, or one of multiple blocker ink layers may serve as the tie layer, where the tie layer is configured to maintain the pressure sensitive adhesive with the peelable portion upon removal of the peelable portion. In some embodiments, a pull tab may be formed as part of the peelable portion by maintaining an area of the inner layer free of pressure sensitive adhesive.

In some cases, the inner ink layer may be printed on the blocker ink layer, and the pressure sensitive adhesive may be pattern-applied about a perimeter region of the peelable portion such that the inner ink layer is aligned with a central region of the peelable portion that is free of pressure sensitive adhesive. In other cases, however, the inner layer may be flood coated with the pressure sensitive adhesive, and the inner ink layer may be disposed adjacent to the pressure sensitive adhesive layer.

In some embodiments, permanent adhesive may be applied around the pressure sensitive adhesive layer, and the cut line may be defined within the pressure sensitive adhesive layer or through a deadened pull tab area (e.g., an area free of any adhesive), as described above. In some cases, the cut line may be defined using precision die cutting, whereas in other cases the cut line may be defined by laser scoring through at least part of the thickness of the laminate structure. In some embodiments, the cut line may include an uninterrupted tear-through area that is configured to show evidence of tampering.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A flexible laminate structure for a package comprising:
an outer layer;
an inner layer laminated to the outer layer;
at least one blocker ink layer disposed between the inner layer and the outer layer;
an inner ink layer disposed between the at least one blocker ink layer and the inner layer;
a cut line defined through part of a thickness of the laminate structure to form a removable portion that includes at least the inner ink layer, the at least one blocker ink layer, and the outer layer, wherein:
the at least one blocker ink layer obscures the inner ink layer from view through the outer layer;
the inner ink layer is visible on the removable portion after removal of the removable portion from the inner layer; and
the removable portion is configured to completely separate from the package; and
a pressure sensitive adhesive layer disposed adjacent the inner layer, within at least a portion of the location of the removable portion and extending across the cut line.

2. The flexible laminate structure of claim 1 further comprising an outer ink layer disposed between the outer layer and the blocker ink layer, wherein the removable portion includes the outer ink layer, and wherein the outer ink layer is visible through the outer layer.

3. The flexible laminate structure of claim 1, wherein the pressure sensitive adhesive layer includes an area devoid of pressure sensitive adhesive so as to form a pull tab of the removable portion.

4. The flexible laminate structure of claim 1, additionally comprising a tie layer disposed between the at least one blocker ink layer and the inner ink layer, wherein the tie layer is configured to maintain the pressure sensitive adhesive layer with the removable portion upon removal of the removable portion.

5. The flexible laminate structure of claim 1, wherein the inner ink layer is adjacent the pressure sensitive adhesive layer.

6. The flexible laminate structure of claim 1, wherein the pressure sensitive adhesive layer extends at least partially outside of the removable portion.

7. A flexible laminate structure for a package comprising:
an outer layer;
an inner layer laminated to the outer layer;
at least one blocker ink layer disposed between the inner layer and the outer layer;
an inner ink layer disposed between the at least one blocker ink layer and the inner layer;
a cut line defined through part of a thickness of the laminate structure to form a removable portion that includes at least the inner ink layer, the at least one blocker ink layer, and the outer layer, wherein:
the at least one blocker ink layer obscures the inner ink layer from view through the outer layer;
the inner ink layer is visible on the removable portion after removal of the removable portion from the inner layer; and
the removable portion comprises a perimeter region and a central region; and
a pressure sensitive adhesive layer disposed adjacent the inner layer, within at least the perimeter region, wherein the central region of the removable portion is free of pressure sensitive adhesive.

8. The flexible laminate structure of claim 7, wherein the removable portion is configured to completely separate from the package.

9. The flexible laminate structure of claim 7, wherein the pressure sensitive adhesive layer extends across the cut line.

10. The flexible laminate structure of claim 7, wherein the inner ink layer is aligned with the central region of the removable portion.

11. The flexible laminate structure of claim 7 further comprising an outer ink layer disposed between the outer layer and the blocker ink layer, wherein the removable portion includes the outer ink layer, and wherein the outer ink layer is visible through the outer layer.

12. The flexible laminate structure of claim 7, wherein the pressure sensitive adhesive layer includes an area devoid of pressure sensitive adhesive so as to form a pull tab of the removable portion.

13. The flexible laminate structure of claim 7, additionally comprising a tie layer disposed between the at least one blocker ink layer and the inner ink layer, wherein the tie layer is configured to maintain the pressure sensitive adhesive layer with the removable portion upon removal of the removable portion.

14. The flexible laminate structure of claim 7, wherein the inner ink layer is adjacent the pressure sensitive adhesive layer.

15. The flexible laminate structure of claim 7, wherein the pressure sensitive adhesive layer extends at least partially outside of the removable portion.

\* \* \* \* \*